United States Patent
Yamazaki et al.

(10) Patent No.: US 10,899,281 B2
(45) Date of Patent: Jan. 26, 2021

(54) VEHICLE DASHBOARD

(71) Applicant: TOYOTA JIDOSHA KABUSHIKI KAISHA, Toyota (JP)

(72) Inventors: Yasunobu Yamazaki, Okazaki (JP); Manami Nakamura, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 16/120,703

(22) Filed: Sep. 4, 2018

(65) Prior Publication Data

US 2019/0092246 A1   Mar. 28, 2019

(30) Foreign Application Priority Data

Sep. 26, 2017 (JP) .................................. 2017-185099

(51) Int. Cl.
B60R 7/06    (2006.01)
(52) U.S. Cl.
CPC ...................................... B60R 7/06 (2013.01)
(58) Field of Classification Search
CPC ......................................................... B60R 7/06
USPC ..................................................... 296/37.12
See application file for complete search history.

(56) References Cited

U.S. PATENT DOCUMENTS

| 7,513,528 | B2* | 4/2009 | Penner | B60R 7/06 |
| | | | | 280/752 |
| 2003/0129418 | A1* | 7/2003 | Tamura | B60R 7/06 |
| | | | | 428/432 |
| 2010/0109365 | A1* | 5/2010 | Shibata | B60R 7/06 |
| | | | | 296/37.12 |
| 2016/0075298 | A1 | 3/2016 | Ozawa et al. | |

FOREIGN PATENT DOCUMENTS

| JP | 2003-040039 A | 2/2003 |
| JP | 2007-290459 A | 11/2007 |
| JP | 2016-060323 A | 4/2016 |

* cited by examiner

*Primary Examiner* — Joseph D. Pape
*Assistant Examiner* — Dana D Ivey
(74) *Attorney, Agent, or Firm* — Oliff PLC

(57) ABSTRACT

A backing section is adjacently disposed in front, in a front-and-rear direction of the vehicle, of an upper portion of a door section of a glove box, and inhibits the door section from moving further forward from a position at a time of the glove box being in a closed state. A reinforcing bead for enhancing rigidity is formed on a contact surface of the backing section with the door section. When a vehicle comes into a frontal collision, and knees K of a passenger collide with the backing section, the backing section becomes difficult to deform. If the backing section does not deform, a reaction force from the backing section is transmitted to the knees K via the door section, and forward movement of the knees K is restrained.

4 Claims, 6 Drawing Sheets

VEHICLE DASHBOARD

CROSS REFERENCE TO RELATED APPLICATION

The entire disclosure of Japanese Patent Application No. 2017-185099, filed on Sep. 26, 2017, including the specification, claims, drawings, and abstract is incorporated herein by reference in its entirety.

TECHNICAL FIELD

The present disclosure generally relates to a vehicle dashboard, and more particularly to a vehicle dashboard having a glove box provided at a vehicle forward position from a seat in a front-and-rear direction of the vehicle.

BACKGROUND

Conventionally, a dashboard has been provided in front, in a front- and rear direction of the vehicle, of (hereinafter, simply described as "forward") front seats. A dashboard refers to all interior components located at the vehicle forward position from the front seats of a vehicle, and the dashboard includes instruments, operation sections of electronic devices (an air conditioner, an audio system and the like), blowing ports of the air conditioner, a glove box and the like.

The glove box is a storage box that is openable and closable, and is provided at the vehicle forward position from a seat (in general, a passenger seat). For example, JP 2007-290459 A discloses a glove box provided at the vehicle forward position from a passenger seat, and an opening portion of the glove box can be opened wide without colliding with the knees of a passenger.

A glove box is provided with a door section including a knob (a grip). A glove box can typically be opened by pulling out the door section to a near side (a vehicle interior space side, that is, rearward). A backing section is provided at the vehicle forward position from the door section such that the door section does not move forward further when the glove box is in a closed state. The door section which is pushed further forward from the closed state contacts with the backing section, and thereby forward movement of the door section is inhibited.

When a vehicle comes into a frontal collision, the passenger sitting in the seat moves forward, the knees of the passenger collide with the door section of the glove box, and a load is inputted to the backing section via the door section. If the backing section inhibits the forward movement of the door section without being deformed at this time, and can transmit a reaction force to the door section efficiently, the reaction force is transmitted to the knees of the passenger via the door section, and thereby forward movement of the knees of the passenger is restrained.

However, there has conventionally been a risk that the backing section will be deformed during a frontal collision of a vehicle due to insufficient strength of the backing section, and thereby cannot sufficiently inhibit the forward movement of the door section, and the door section moves further forward from the closed state. In that case, the reaction force for restraining the forward movement of the knees of the passenger is not generated, so that there is a risk that the knees of the passenger will move forward.

It is an advantage of the present disclosure to provide a vehicle dashboard that can restrain forward movement of the knees of a passenger sitting in a seat at a time of a frontal collision of a vehicle.

SUMMARY OF THE INVENTION

The present disclosure is a vehicle dashboard, including a glove box provided in front, in a front-and-rear direction of the vehicle, of a seat, and having a door section that is openable and closable, and a backing section adjacently disposed in front, in a front-and-rear direction or the vehicle, of the door section of the glove box in a closed state, the backing section having a reinforcing bead formed thereon.

The reinforcing bead is formed on the backing section, and thereby rigidity of the backing section is enhanced. Thereby, the backing section becomes difficult to deform when the vehicle comes into a frontal collision, and the load from the knees of the passenger sitting in the seat is inputted to the backing section via the door section. If the backing section can generate the reaction force to the door section without being deformed, the reaction force is transmitted to the knees of the passenger via the door section, and forward movement of the knees of the passenger is restrained.

Preferably, the reinforcing bead includes a groove portion formed on a surface of the backing section on a door section side, the groove portion having side walls on opposite sides in a vehicle width direction, and the door section has a protruded portion that restrains movement of the glove box in the vehicle width direction with respect to the backing section by being fitted in the groove portion when the glove box is in the closed state.

When it is a precondition that the knees of the passenger move straight forward at the time of a frontal collision of the vehicle, the load from the knees of the passenger is inputted to the backing section as a force in a substantially only the forward direction, with the movement of the glove box in the vehicle width direction being restrained. Further, in response to this, the reaction force from the backing section is also inputted to the knees of the passenger as a force in a substantially only the rearward direction. That is, the reaction force in the rearward direction for restraining the forward movement of the knees of the passenger may be generated more efficiently.

Preferably, a load transmitting section provided between a vehicle frame, provided in front, in a front-and-rear direction of the vehicle, of the backing section, and the backing section, and extending in a front-and-rear direction of the vehicle, the load transmitting section being configured to transmit a load to the vehicle frame from the backing section when there is a frontal collision of the vehicle, is further included.

By providing the load transmitting section, a structure in which the vehicle frame and the load transmitting section support the backing section from the forward position is provided. Thereby, when the vehicle comes into a frontal collision, and the load from the knees of the passenger is inputted to the backing section via the door section, the reaction force from the backing section to the knees of the passenger is generated, a part of the load from the knees of the passenger is transmitted to the vehicle frame via the load transmitting section, and the reaction force from the vehicle frame is also transmitted to the knees of the passenger. Accordingly, even when a load which is so large that the forward movement of the knees of the passenger cannot be inhibited by only the backing section is inputted from the knees of the passenger, the forward movement of the knees of the passenger may be restrained by the reaction force from the vehicle frame.

According to the present disclosure, the vehicle dashboard can be provided, which can restrain the forward movement of the knees of the passenger sitting in the seat at the time of the frontal collision of the vehicle.

BRIEF DESCRIPTION OF DRAWINGS

Embodiments of the present disclosure will be described based on the following figures, wherein.

DESCRIPTION OF EMBODIMENT

Hereinafter, an embodiment will be described. Note that in the present description, up or down means up or down in a up-and-down direction of the vehicle, front or rear means front or rear in a front-and-rear direction of the vehicle, and right or left means right or left when facing forward.

Figure 1:
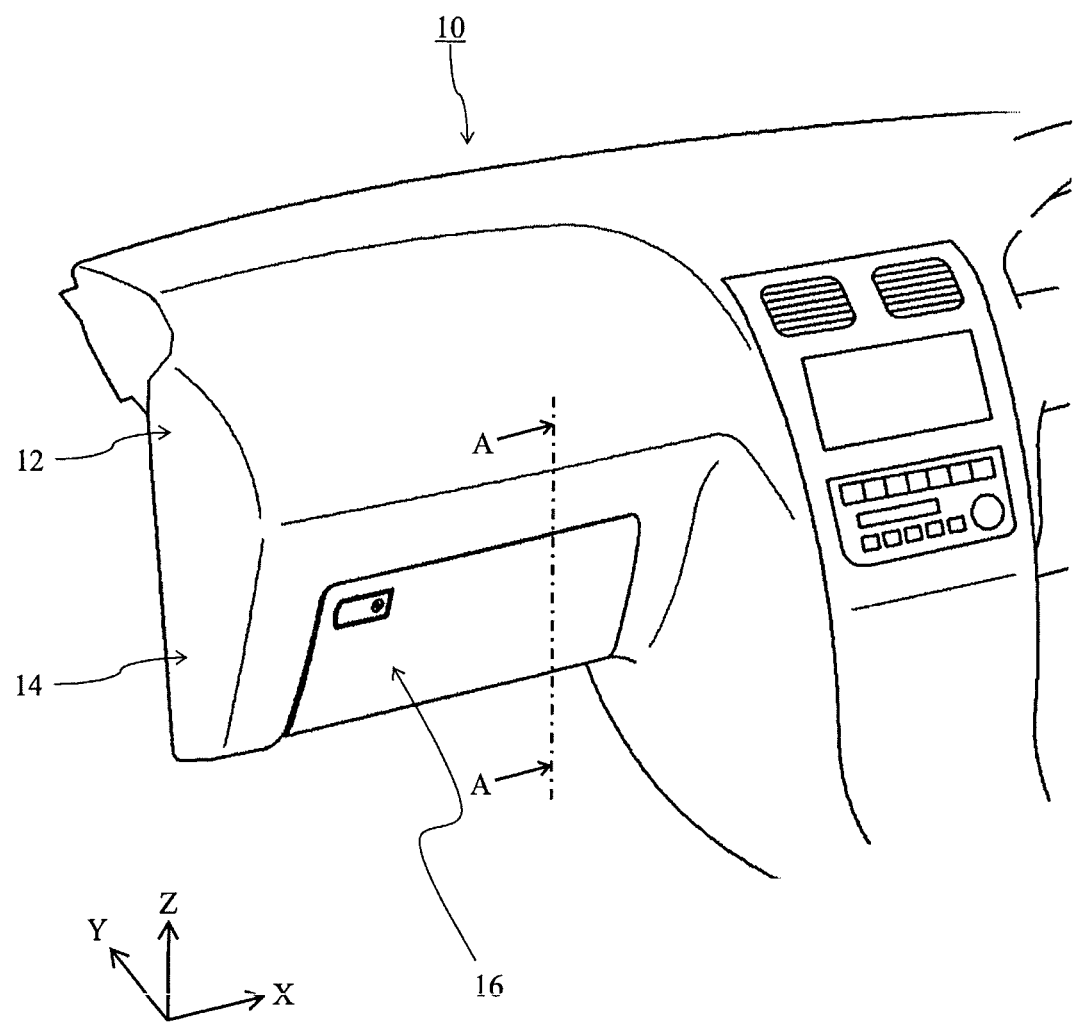
FIG. 1 is a perspective view of a dashboard according to the present embodiment.

FIG. 1 is a perspective view of a vehicle dashboard 10 according to the present embodiment. The vehicle dashboard 10 in the present description means entire interior components located on a lower side of a windshield and are at the vehicle forward position from front seats including a driver's seat and a passenger seat. The vehicle dashboard 10 is provided with an upper panel 12 that is an upper section, a lower panel 14 that is a lower section, and a glove box 16 that is attached to the lower panel 14. Note that in the figures of the present specification, a vehicle width direction (a lateral direction) is set as an X-axis, a longitudinal direction is set as a Y-axis, and a vertical direction is set as a Z-axis.

The glove box 16 is a storage box that is openable and closable. A vehicle illustrated in FIG. 1 is a vehicle with a right-hand steering wheel, and the glove box 16 is provided at the vehicle forward position from the passenger seat. Since the glove box 16 is attached to the lower panel 14 as described above, the glove box 16 is provided at a position of a height of the knees of the passenger sitting in the passenger seat.

Figure 2:
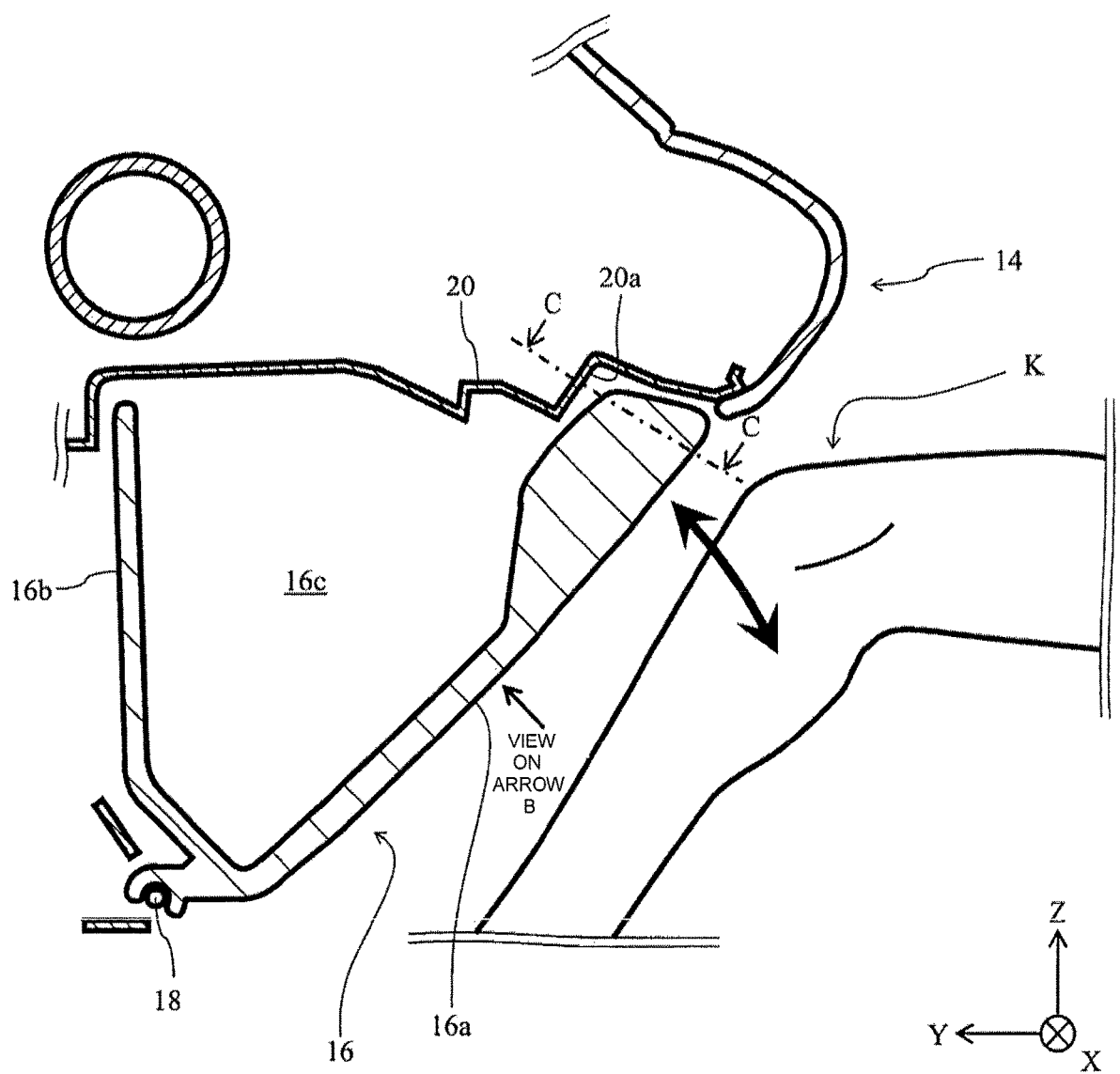
FIG. 2 is a sectional view seen from direction A-A in FIG. 1.

FIG. 2 is a sectional view (an YZ sectional view) seen from direction A-A in FIG. 1. The glove box 16 is provided with a door section 16a and respective wall sections. The door section 16a is a section having a grip, and having a rear side surface thereof exposed to a vehicle interior space. The respective wall sections are disposed forward of the door section 16a, and are constructed by side wall sections provided at both right and left ends of the glove box 16 in addition to a front wall section 16b illustrated in FIG. 2. A storage space 16c of the glove box 16 is formed by the door section 16a and the respective wall sections. Note that the door section 16a and the respective wall sections are integrated with one another.

A lower end portion of the glove box 16 is attached to a horizontal shaft 18. The horizontal shaft 18 is a part of the lower panel 14 and is a shaft extending in a lateral direction. The glove box 16 is attached rotatably in an YZ plane with the horizontal shaft 18 as a center, and is opened and closed by the rotation. Specifically, a state illustrated in FIG. 2, that is, a state in which the storage space 16c and the vehicle interior space are partitioned by the door section 16a, is a closed state, and the glove box 16 rotates clockwise in FIG. 2 from that state, and is thereby brought into an open state in which the passenger can access the storage space 16c.

The backing section 20 is a part of the lower panel 14, and is formed from, for example, a resin such as plastic. The backing section 20 is provided such that at least a part of the backing section 20 is disposed adjacently to and at the vehicle forward position from the door section 16a. In detail, the backing section 20 is provided such that at least a part of the backing section 20 is disposed adjacently to and at the vehicle forward position from a part (an upper end portion in the present embodiment) of the door section 16a.

The backing section 20 inhibits the door section 16a from moving further forward from a position at the time of the glove box 16 being in a closed state. Specifically, when the door section 16a is pushed forward when the glove box 16 is in the closed state, the upper end portion of the door section 16a and the backing section 20 abut on each other, and thereby forward movement beyond that of the door section 16a, that is, counterclockwise rotation of the glove box 16 with the horizontal shaft 18 as the center, is inhibited. Of the backing section 20, a surface that contacts the door section 16a which is pushed forward from the closed state is described as a contact surface 20a.

Note that as illustrated in FIG. 2, when the glove box 16 is in the closed state, the backing section 20 constitutes an upper wall section of the storage space 16c.

Figure 3:
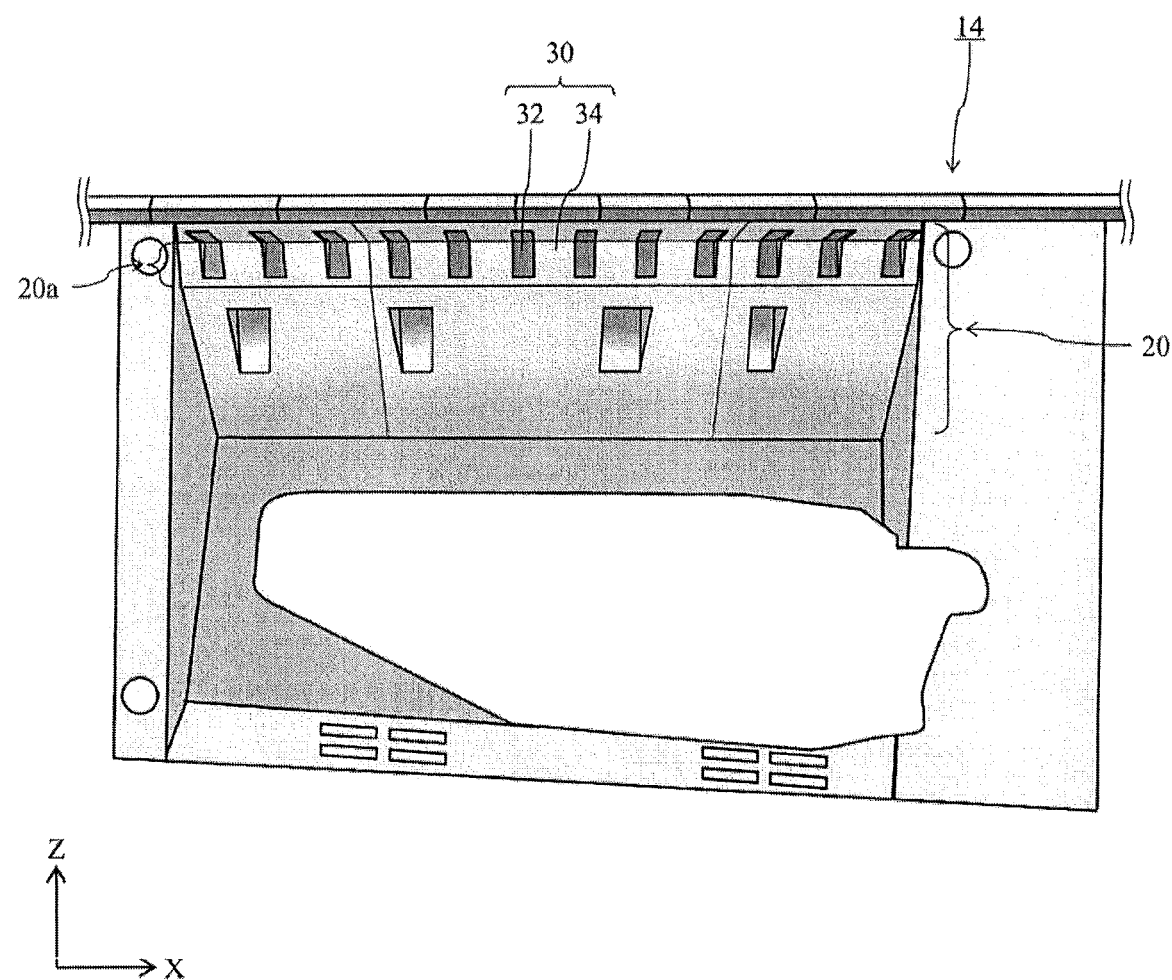
FIG. 3 is a view on arrow B in FIG. 2 of a state where a glove box is detached.
Figure 4:
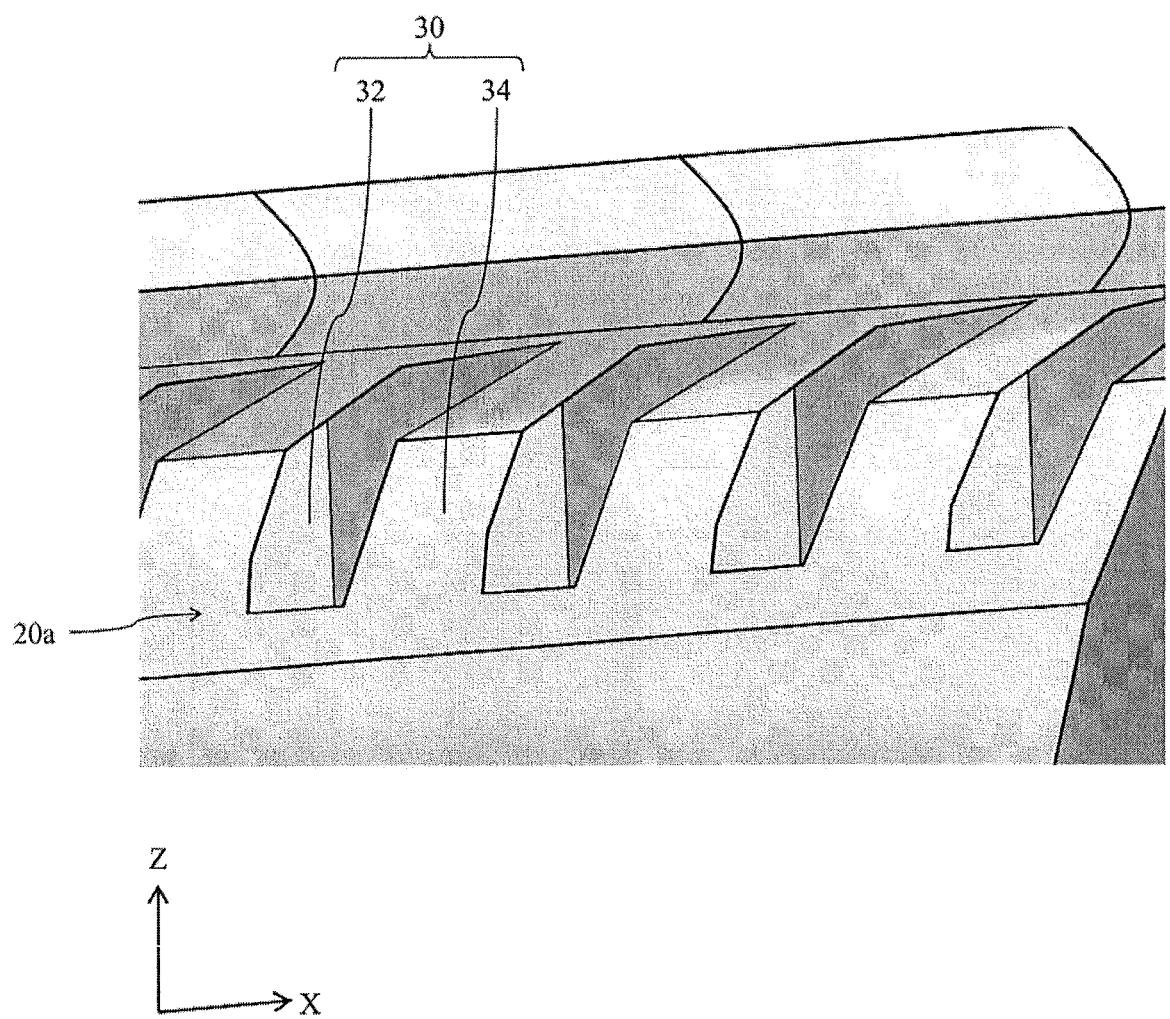
FIG. 4 is an enlarged perspective view of a reinforcing bead.

FIG. 3 is a view on arrow B in FIG. 2 of a state where the glove box 16 is detached from the lower panel 14. FIG. 3 illustrates a part of the lower panel 14 including the backing section 20. As illustrated in FIG. 3, a reinforcing bead 30 is formed in the backing section 20. In particular, on the contact surface 20a of the backing section 20, a plurality of reinforcing beads 30 are formed. FIG. 4 illustrates an enlarged perspective view of the reinforcing bead 30 provided on the contact surface 20a.

The reinforcing bead 30 is constructed by a combination of a linear groove portion (recessed portion) 32, and a linear ridge portion (protruded portion) 34 extending parallel with the groove portion 32. In the present embodiment, in a rear side surface of the backing section 20, a plurality of groove portions 32 are formed parallel with one another, whereby portions sandwiched by the respective groove portions 32 of a rear side surface of the backing section 20 become the ridge portions 34 relatively to the groove portions 32. Though FIGS. 3 and 4 illustrate only the rear side surface of the backing section 20, the reinforcing beads 30 may be similarly formed on a front side surface or a back side of the backing section 20.

By the reinforcing beads 30 being formed, a section modulus or a geometrical moment of inertia of the backing section 20 is enhanced, that is, rigidity of the backing section 20 is enhanced.

In the present embodiment, as illustrated in FIG. 3 and FIG. 4, a plurality of reinforcing beads 30 which are formed on the contact surface 20a are formed to extend in a perpendicular direction to the lateral direction (the X-axis direction). Thereby, rigidity of the contact surface 20a, in particular, bending strength to bending in which a bend line (fold) is parallel with the lateral direction, is enhanced.

Note that from a viewpoint of enhancing rigidity of the backing section 20, an extending direction of the reinforcing bead 30 may be other directions. For example, the reinforcing bead 30 may be formed to extend in a direction parallel with the lateral direction. In this case, the bending strength of the backing section 20 to bending in which the bend line (fold) is perpendicular to the lateral direction is enhanced.

As above, in the present embodiment, rigidity of the backing section 20, in particular, the contact surface 20*a*, is enhanced by the reinforcing beads 30. Thereby, the backing section 20 is difficult to deform when the vehicle comes into a frontal collision, knees K (refer to FIG. 2) of the passenger sitting in the passenger seat collide with the door section 16*a* of the glove box 16, and a load is inputted to the backing section 20 via the door section 16*a*. If the backing section 20 does not deform, and the door section 16*a* stops firmly in the position of the backing section 20, a reaction force is reliably transmitted to the knees K from the backing section 20 via the door section 16*a*, and forward movement of the knees K can be restrained.

Figure 5:
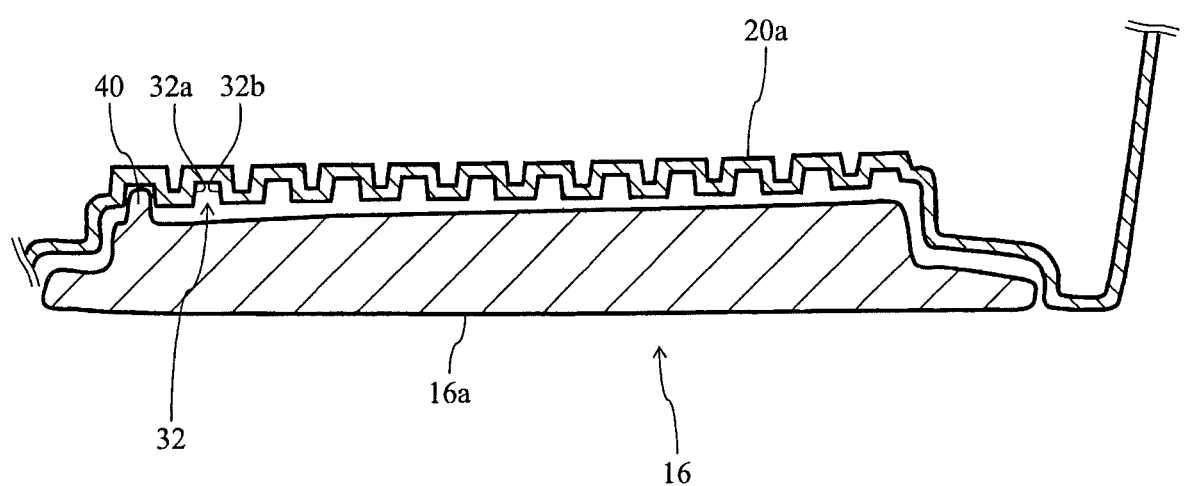
FIG. 5 is a sectional view seen from direction C-C in FIG. 2.

FIG. 5 is a sectional view seen from direction C-C in FIG. 2.

In the present embodiment, the contact surface 20*a* is an inclined surface facing rearward and downward as illustrated in FIG. 2, so that it can be said that at the contact surface 20*a*, a plurality of reinforcing beads 30 which are formed in the perpendicular direction to the lateral direction have a shape extending in the vertical direction and the longitudinal direction. That is, the groove portion 32 included in the reinforcing bead 30 in the present embodiment is in a shape having side walls 32*b* and 32*a* on both right and left sides.

As illustrated in FIG. 5, at the door section 16*a* of the glove box 16, a protruded portion 40 that is provided on a front side surface of the door section 16*a*, in particular, a surface facing the contact surface 20*a* of the backing section 20, is provided. In the present embodiment, the protruded portion 40 is molded integrally with the door section 16*a*, but the protruded portion 40 may be provided in other modes. The protruded portion 40 is fitted in the groove portion 32 provided on the contact surface 20*a* that is a surface of the backing section 20 on a door section 16*a* side, when the glove box 16 is in the closed state.

As described above, in the present embodiment, the groove portion 32 provided on the contact surface 20*a* is in a shape having the side walls 32*b* and 32*a* on the right and left sides, so that in a state where the glove box 16 is in the closed state and the protruded portion 40 is fitted in the groove portion 32, the protruded portion 40 abuts on the side walls 32*b* and 32*a* on the right and left sides of the groove portion 32, whereby movement (deviation) in the lateral direction of the glove box 16 to the backing section 20 is restrained.

When the knees K move straight forward at the time of a frontal collision of the vehicle, movement of the glove box 16 in the lateral direction is restrained, and thereby the load from the knees K is inputted to the backing section 20 via the door section 16*a* as a force in substantially only a forward direction, so that in response to this, the reaction force from the backing section 20 is a force in substantially only a rearward direction. That is, the reaction force in the rearward direction to restrain the forward movement of the knees K can be generated more efficiently. Further, movement of the glove box 16 in the lateral direction is restrained at the time of a frontal collision of the vehicle, and thereby the knees K of the passenger, which collide with the door section 16*a* of the glove box 16, are restrained from moving in the lateral direction with the glove box 16.

Figure 6:
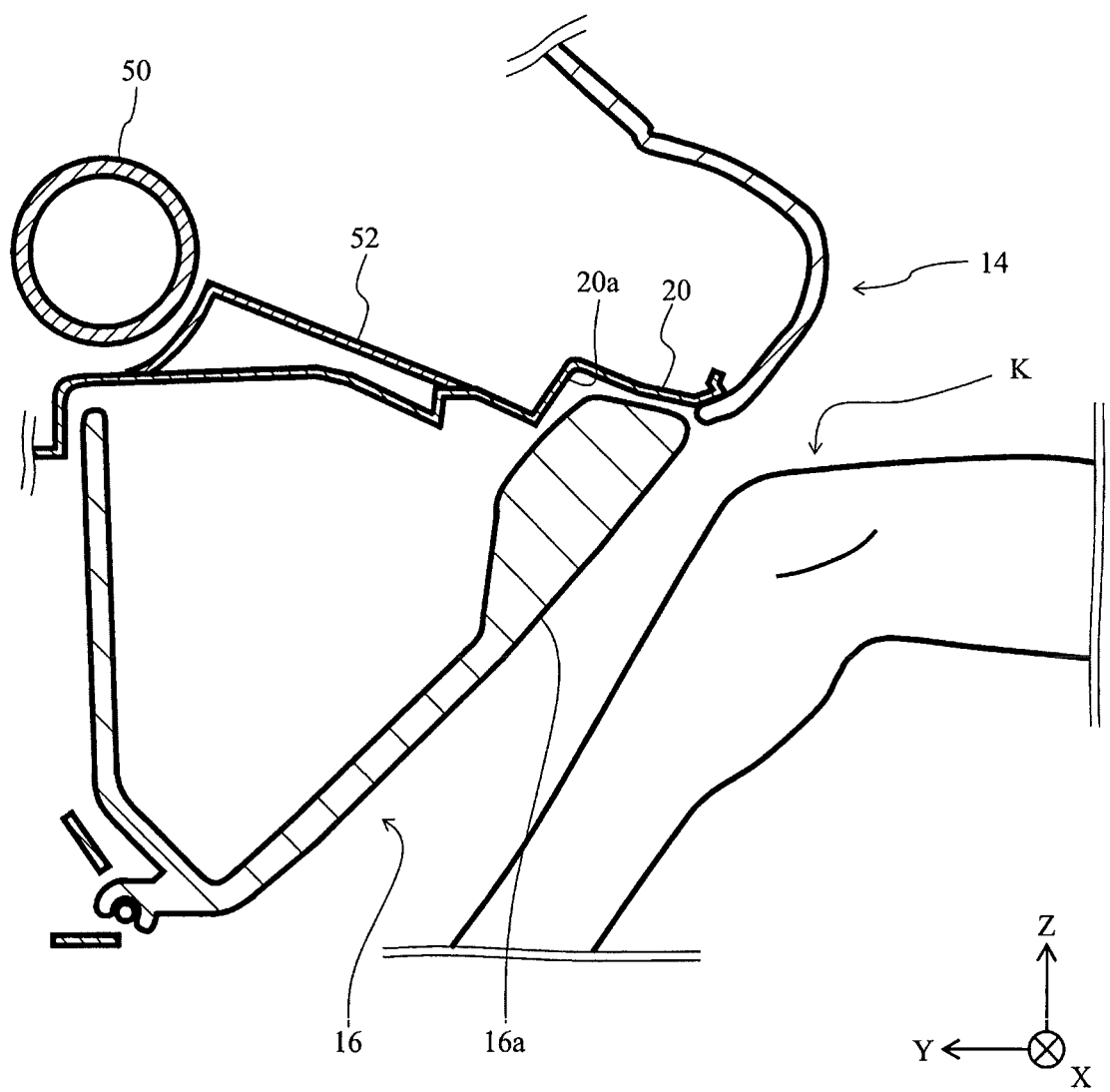
FIG. 6 is a sectional view seen from direction A-A in FIG. 1 of a modified example of the present embodiment.

FIG. 6 is a sectional view seen from direction A-A in FIG. 1 of a modified example of the present embodiment.

An instrument panel reinforcement 50 is a vehicle frame that extends in the lateral direction, and has a YZ section in a substantially circular shape (that is, a cylindrical shape). The instrument panel reinforcement 50 is a member that is provided at the vehicle forward position from the backing section 20, inside the vehicle dashboard 10, and is for supporting a steering wheel, and the upper panel 12 or the lower panel 14. The instrument panel reinforcement 50 is formed from a metal, and has higher rigidity than at least the backing section 20.

In the modified example, after the reinforcing beads 30 are provided in the backing section 20, a reinforcing member 52 as a load transmitting section is provided between the backing section 20 and the instrument panel reinforcement 50. The reinforcing member 52 is a member for transmitting a load to the instrument panel reinforcement 50 from the backing section 20 at the time of a frontal collision of the vehicle.

The reinforcing member 52 is provided of a resin similarly to the lower panel 14, and has a shape extending in the longitudinal direction. In the present embodiment, the reinforcing member 52 has a columnar shape, but the reinforcing member 52 may be in other shapes. In the present embodiment, the reinforcing member 52 is connected to the backing section 20 and extends to a vicinity of the instrument panel reinforcement 50. Further, in FIG. 6, only one reinforcing member 52 is illustrated, but in the present embodiment, a plurality of reinforcing members 52 are provided side by side in the lateral direction.

By the reinforcing members 52 being provided, a structure in which the instrument panel reinforcement 50 and the reinforcing members 52 support the backing section 20 from a front is provided. Thereby, when the vehicle comes into a frontal collision, and the load from the knees K of the passenger is inputted to the backing section 20 via the door section 16*a*, a reaction force to the knees K from the backing section 20 occurs, and a part of the load from the knees K is transmitted to the instrument panel reinforcement 50 via the reinforcing member 52. Subsequently, a reaction force from the instrument panel reinforcement 50 which receives a part of the load is transmitted to the knees K via the reinforcing member 52, the backing section 20 and the door section 16*a*. Accordingly, even when a load which is so large that forward movement of the door section 16*a* (that is, the knees K) cannot be restrained by only the backing section 20 is inputted from the knees K, the forward movement of the knees K can be restrained by the reaction force from the instrument panel reinforcement 50.

An end portion on an instrument panel reinforcement 50 side of the reinforcing member 52 is preferably in a shape along an outer shape of the instrument panel reinforcement 50 such that the reinforcing member 52 can transmit a load more efficiently to the instrument panel reinforcement 50. In the present embodiment, as illustrated in FIG. 6, the end portion on the instrument panel reinforcement 50 side of the reinforcing member 52 is in a shape curving along an outer surface of the instrument panel reinforcement 50 in the cylindrical shape.

Further, the reinforcing member 52 is preferably connected to a rear side of the contact surface 20*a* or to a vicinity of the back side of the contact surface 20*a* of the backing section 20 such that the reinforcing member 52 can receive the load from the backing section 20 more efficiently.

Further, as the load transmitting section, a metal bracket extending from the instrument panel reinforcement 50 may be included, in addition to the reinforcing member 52. The bracket may be in a columnar shape similarly to the reinforcing member 52 in the present embodiment.

Further, with the protruded portion 40 (refer to FIG. 5) which restrains movement of the glove box 16 in the lateral direction with respect to the backing section 20, the load from the knees K is efficiently inputted to the reinforcing member 52 or the bracket via the door section 16a and the backing section 20 as a force in substantially only the forward direction.

In particular, when the reinforcing member 52 has a columnar shape extending in the longitudinal direction, the reinforcing member 52 can transmit the load to the instrument panel reinforcement 50 most efficiently when the force in the forward direction is applied to the reinforcing member 52, and can also transmit the reaction force from the instrument panel reinforcement 50 to the backing section 20 most efficiently. If a force in an oblique direction to the longitudinal direction is applied to the reinforcing member 52, the reinforcing member 52 cannot transmit the load to the instrument panel reinforcement 50 efficiently, and in addition, a bending load is also exerted on the reinforcing member 52 itself. The same may be said of the bracket.

Movement of the glove box 16 in the lateral direction with respect to the backing section 20 is restrained, whereby the load in the forward direction is inputted to the columnar reinforcing member 52 or the bracket, and the reinforcing member 52 or the bracket can efficiently transmit the load to the instrument panel reinforcement 50. Further, in response to this, the reaction force to the rearward direction from the instrument panel reinforcement 50 is inputted to the reinforcing member 52 or the bracket, and the reinforcing member 52 or the bracket can efficiently transmit the reaction force to the backing section 20. Further, movement of the glove box 16 in the lateral direction with respect to the backing section 20 is restrained, whereby the force in the oblique direction to the longitudinal direction, which is exerted onto the columnar reinforcing member 52 or the bracket, is reduced, and a bending load exerted onto the reinforcing member 52 or the bracket can be reduced.

The embodiment according to the present disclosure is described above, but the present disclosure is not limited to the above described embodiment, and various changes can be made without departing from the gist of the present disclosure.

The invention claimed is:

1. A vehicle dashboard, comprising:
   a glove box provided in front, in a front-and-rear direction of the vehicle, of a seat, and having a door section that is openable and closable; and
   a backing section adjacently disposed in front, in a front-and-rear direction of the vehicle, of the door section of the glove box in a closed state, the backing section forming an upper wall section of a storage space of the glove box, the backing section including a contact surface that contacts the door section when the door section is pushed forward from the closed state, the backing section having a reinforcing bead formed thereon.

2. The vehicle dashboard according to claim 1, wherein the reinforcing bead includes a groove portion formed on a surface of the backing section on a door section side, the groove portion having side walls on opposite sides in a vehicle width direction, and
   the door section has a protruded portion that restrains movement of the glove box in the vehicle width direction with respect to the backing section by being fitted in the groove portion when the glove box is in the closed state.

3. The vehicle dashboard according to claim 1, further comprising:
   a load transmitting section that is provided between a vehicle frame, provided in front, in a front-and-rear direction of the vehicle, of the backing section, and the backing section, and extends in a front-and-rear direction of the vehicle, the load transmitting section being configured to transmit a load to the vehicle frame from the backing section when there is a frontal collision of the vehicle.

4. The vehicle dashboard according to claim 2, further comprising:
   a load transmitting section that is provided between a vehicle frame, provided in front, in a front-and-rear direction of the vehicle, of the backing section and the backing section, and extends in a front-and-rear direction of the vehicle, the load transmitting section being configured to transmit a load to the vehicle frame from the backing section when there is a frontal collision of the vehicle.

* * * * *